United States Patent [19]

Löfgren et al.

[11] Patent Number: 4,673,661

[45] Date of Patent: Jun. 16, 1987

[54] CATALYST COMPONENTS, A CATALYST AND A PROCESS FOR THE POLYMERIZATION OF OLEFINS

[75] Inventors: Barbro U. Löfgren, Helsinki, Finland; Luciano Luciani, Ferrara, Italy; Hanneli Seppänen; Maria H. Stjernberg, both of Helsinki; Eero I. Iiskola, Porvoo, all of Finland

[73] Assignee: Neste Oy, Espoo, Finland

[21] Appl. No.: 821,070

[22] Filed: Jan. 21, 1986

[30] Foreign Application Priority Data

Jan. 22, 1985 [DE] Fed. Rep. of Germany ....... 3501858

[51] Int. Cl.$^4$ ............................................... C08F 4/64
[52] U.S. Cl. .................................... 502/111; 502/104; 502/119; 526/125
[58] Field of Search ...................... 502/104, 111, 119

[56] References Cited

U.S. PATENT DOCUMENTS

| | | | |
|---|---|---|---|
| 3,135,809 | 6/1964 | Bosmajian | 502/103 X |
| 4,252,670 | 2/1981 | Caunt et al. | 502/111 X |
| 4,279,776 | 7/1981 | Shiga et al. | 502/119 X |
| 4,335,229 | 6/1982 | Sakurai et al. | 502/119 X |
| 4,364,851 | 12/1982 | Shiga et al. | 502/119 X |
| 4,399,054 | 8/1983 | Ferraris et al. | 252/429 B |
| 4,442,225 | 4/1984 | Takitani et al. | 502/119 X |

*Primary Examiner*—Patrick P. Garvin

[57] ABSTRACT

Catalysts for polymerization and copolymerization of olefins to form polymers having a high degree of isotacticity and fast rate of crystal transformation. The catalysts embody a component made by chlorinating a magnesium alkyl with chlorine or a mixture of chlorine and alkyl chloride to form a carrier, contacting the carrier first with liquid TiCl$_4$, then with a Lewis base, and after that at least once with TiCl$_4$ in the absence of Lewis base.

23 Claims, 4 Drawing Figures

FIG 3  13C-NMR-SPECTRA OF PB

CATALYST COMPONENTS, A CATALYST AND A PROCESS FOR THE POLYMERIZATION OF OLEFINS

This invention concerns a new catalyst component, a catalyst containing this component and a process for polymerization of olefins by using this catalyst for obtaining stereospecific olefin polymers and copolymers with high degree of crystallinity and high molecular weight.

For polymerizing alpha olefin, such as propylene and 1-butene into crystalline polymers with high bulk density, stereospecific Ziegler-Natta catalysts are usually used. In suspension polymerizations of the prior art, catalysts based on $TiCl_3$ with no carrier have been used as a rule. A drawback of such processes is the fact that subsequent to polymerization the action of the catalyst has to be interrupted and the catalyst has to be removed from the end product.

Better results in alpha olefin polymerization have been achieved by utilizing modified catalysts of Ziegler-Natta type, which contain a titanium-compound supported on a carrier, an organoaluminum compound and an electron donor compound. Procedures for producing catalysts of this type have been presented, for instance in the following patents: EP 0043185, 0044445, 0029623; BE 845593, 843224, 858156, 849216, 848527, 868762; U.S. Pat. Nos. 4,252,670, 4,399,054, 4,158,642; GB 2,000,514; JP 53017684, 54118484, 54131589, 54103494; DE 2809318, 2734652, 2912895, 2922298 and 2831829.

An important step in the manufacture of these new catalysts is the forming of said titanium compound. There are numerous patent applications and patents which disclose the forming of said titanium compound by treating a solid magnesium compound with titanium tetrachloride in the presence or absence of an electron donor compound. The most common magnesium compound described in these publications is magnesium dichloride, which has been activated with different kinds of treatments. As the magnesium compound it has also been proposed to use organic magnesium compounds treated with halogenating agents for the manufacture of solid carrier containing organic magnesium compound.

The morphological properties of the solid catalyst component have a great effect on the activity and other properties of the final catalyst. The morphological properties depend essentially of the starting materials used, the reagents, the reaction conditions and the order of the treatments. By changing only the order of the treatments it may be possible to obtain better or worse catalytic properties. Most patent publications contain lists of materials which can be used in the manufacture of catalyst components, but very few of them give information about what materials actually have to be used, in what order or sequence and under which reaction conditions. Moreover most examples presented in the patent literature describe only the use of magnesium dichloride as the starting material of the catalyst carrier component.

It has been found according to this invention that by choosing certain starting materials and reagents in the formation of the solid titanium compound and by following certain sequence of treatments it is possible to prepare improved solid catalyst components for catalysts for polymerization of olefins to products having high degree of crystallinity, high molecular weight and good morphology. Thus the invention concerns a solid non-layer catalyst component for use in catalysts for the polymerization of olefins, which catalyst component is obtained by chlorinating at least one organic magnesium compound of the formula MgR'R" wherein R' and R" are the same or different and each is an alkyl radical of 1 to 20 carbon atoms, with at least one chlorinating agent to form a carrier compound and optionally treating said carrier compound with an aliphatic or aromatic alcohol; treating the carrier compound thus obtained with liquid titanium tetrachloride in the presence of an electron donor selected from inorganic and organic esters, amines, ethers, alcoholates, silane compounds, ketones, and phosphor amides at −25 to 180° C.; and recovering said solid non-layer catalyst component. The catalyst component according to the invention is characterized in that chlorine gas or a mixture of chlorine gas and alkyl chloride has been used as said chlorinating agent and that the treatment with titanium tetrachloride has been carried out by treating said carrier compound first with titanium tetrachloride, then with said electron donor compound and after that at least once with titanium tetrachloride in the absence of said electron donor compound.

The invention also concerns new solid catalysts for homopolymerizing or copolymerizing olefins having 2 to 5 carbons to become polymers with high degree of crystallinity and high molecular weight. The catalyst, according to the invention, for homopolymerizing or copolymerizing alpha olefins of 2 to 5 carbon atoms is characterized in that it consists of the following components:

(a) an organometallic aluminum compound of the form $AlR_xCl_{3-x}$ where R is an alkyl and x is between 1 and 3;

(b) an electron donor compound or a Lewis base which is able to form a complex together with the Al compound (a); and (c) the solid non-layer catalyst component above.

In the catalyst according to the invention the aluminum compound with the formula $Al_xCl_{3-x}$ is used as a cocatalyst. For aluminum compound, an aluminumtrialkyl or dialkylaluminum chloride can be used, e.g. triethylaluminum, diethylaluminum chloride, triisobutylaluminum.

For an internal electron donor, or Lewis base, one may use for instance esters, amines, ethers, alcoholates, silane compounds, ketones, phosphoramides, etc. For esters, one may use both inorganic and organic esters. Particularly appropriate are di-isobutylphthalate and esters of aromatic carboxylic acids, such as the alkyl esters of benzoic, p-methoxybenzoic or p-toluic acid (e.g. ethyl benzoate, ethyl p-methoxybenzoate, methyl or ethyl p-toluate, or ethyl p-butoxybenzoate). Other usable esters are diethyl carbonate, ethyl pivalate, ethyl acetate, dimethyl maleate and alkylarylsilanes or alkoxysilanes.

The solid non-layer catalyst component according to the invention is obtained by allowing an organic magnesium compound, chlorinating compounds, a Ti halide and an electron donor or Lewis base to react with each others. The Mg alkyl compounds employed have the form $MgR_2$ or $MgR'R''$, wherein R, R' and R'' are either the same or different, and contain alkyls from $C_1$ to $C_{20}$, preferably $C_2$ to $C_{12}$. The Mg alkyl compound may for instance consist of diethylmagnesium, ethylbutylmagnesium, ethylhexylmagnesium, ethyloctylmagnesium, dibutylmagnesium, butylhexylmagnesium, butyloctylmagnesium, dicyclohexylmagnesium, etc. Among these organomagnesium compounds, the use of butyloctylmagnesium is to be most recommended.

The chlorinating agent is chlorine gas or chlorine gas and an alkyl chloride such as butyl or pentyl chloride, preferably butyl chloride.

The chlorination may be carried out at 0–100° C., preferably at 20–60° C., particularly at 20–40° C. During the chlorination there may also be present in the reaction mixture an electron donor compound which may be selected from the following compounds: amines, esters or silane compounds or mixtures thereof.

Figure 1:
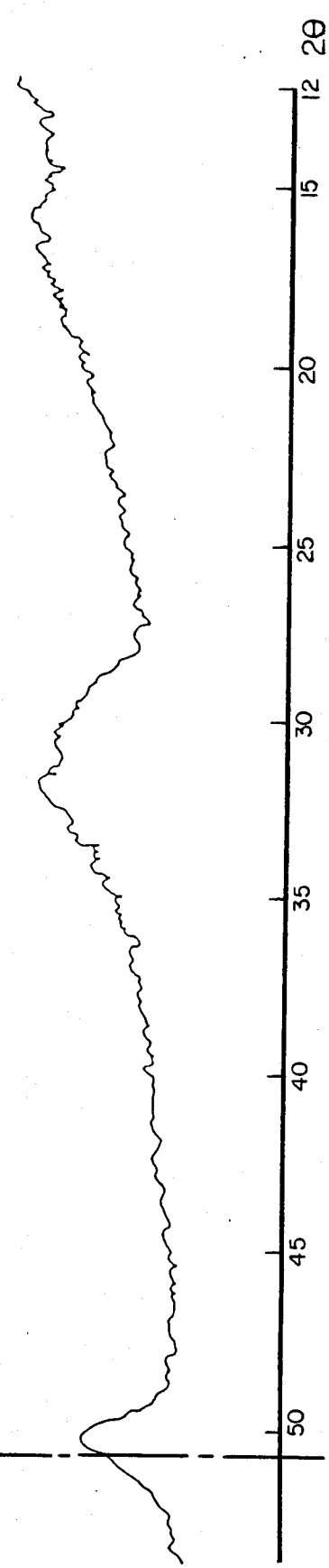
FIG. 1 shows the X-ray diffraction spectrum or pattern of the intermediate solid chlorination product or carrier.

As can be seen from the drawings, the X-ray diffraction spectrum of the solid chlorination product or carrier, as shown in FIG. 1, is very similar to that of a typical catalyst component based on this carrier. Both spectrum patterns show one relatively sharp line at $2\theta = 50°$ and a broad halo in the central region of the pattern.

Figure 2:
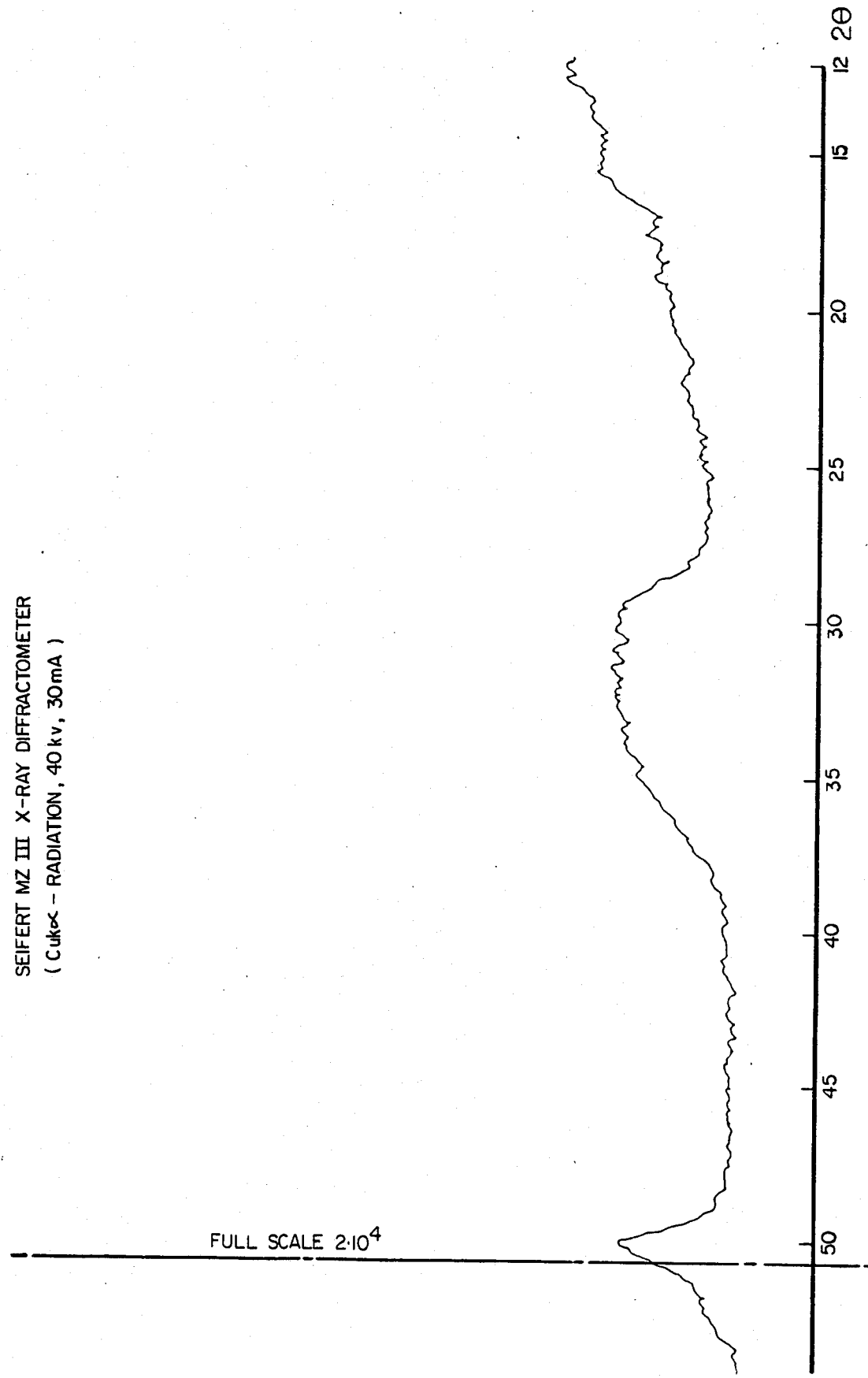
FIG. 2 shows the X-ray diffraction spectrum or pattern of a typical catalyst component of the present invention.

From scientific point of view it is evident that by X-ray diffraction methods a crystal phase of $MgCl_2$ cannot be identified either from the spectrum of carrier (FIG. 1) or from the spectrum of final catalyst component (FIG. 2). In these X-ray diffraction spectra or patterns (XRD) a crystalline peak at 15° $2\theta$, which is fundamental and peculiar in $MgCl_2$, does not appear. This peak 15° $2\theta$, having crystallographic indices 003, is clearly connected to sequences of Cl-Mg-Cl layers stacked along the crystallographic c axis of the $MgCl_2$ structure. In fact the phase of $MgCl_2$ is surely absent as it is reported in literature (JCPDS card No. 25-1156, Chien J.W.C. & al., J.Polym.Sci., 21, 737 (1983), Giannini, U., Macromol. Chem. Suppl. 5, 216, (1981).

The XRD of the chemically activated carrier after chlorination shows almost no crystalline structure at all. The broad peak at $2\theta = 50°$ (110) is the only one that is also found in $MgCl_2$——it is well known, that the characterization of a crystalline phase only on the basis of one diffraction peak is not possible; at least three peaks are needed for that purpose.

Our analyses have also shown, that both the carrier and the catalyst component are not stoichiometric with Mg and Cl. The molar ratio of Mg to Cl can be as low as 1:0.5. About half of the carrier consists of an Mg compound and the rest of it are organic compounds, like hydrocarbons and chlorinated hydrocarbons. The presence of these organic compounds may affect the crystal structure of the product. The formation of a normal crystal lattice is prohibited and a new non-layer species with very low crystallite dimensions are formed.

This new structure consists of much more active corners than the original activated $MgCl_2$ crystal lattice. This, together with the proper surface area and the pore volume, may at least partly explain the high activity for 1-butene for our catalytic system.

The carrier is thereafter treated with alcohol, however, the catalyst can show considerable activity even without this treatment. The alcohol may be aliphatic or aromatic, containing one or several hydroxyl groups, such as e.g. methanol, ethanol, propanol, butanol, 2-ethylhexanol, cyclohexanol, methylcyclohexanol, benzyl alcohol, methylbenzyl alcohol or glycol.

After the chlorination and the optional alcohol treatment the solid carrier is treated with liquid titanium tetrachloride to form the catalyst component. According to the invention the carrier is treated first with titanium tetrachloride, then with an electron donor compound and after that at least once again with liquid titanium tetrachloride in the absence of said electron donor. If the treatment with electron donor is carried out before the treatment with titanium tetrachloride according to prior art or if said treatment with electron donor is carried out during or after any further treatments with titanium tetrachloride, much worse catalyst components for polymerization of alpha olefins are achieved, which will be evident from examples presented later.

The first treatment with liquid titanium tetrachloride is carried out in cold titanium tetrachloride. The temperature is below 0° C., preferably below −20° C. The second treatment with titanium tetrachloride is carried out at a higher temperature. During this treatment the titanation is completed during a prolonged period, preferably at least one hour. The solid reaction product is then separated from the liquid phase and washed with a hydrocarbon solvent for removing impurities and derivatives. The catalyst component may be dried in a slight vacuum or in nitrogen at room temperature, or at a slightly higher temperature, and homogenized by grinding in a ball mill.

External Lewis bases or electron donor compounds which are able to form complexes with Al alkyls are useful with a view to improving the properties of the catalysts. Lewis bases (complexed with an Al alkyl) improve the stereoselectivity of the catalysts.

For external electron donor compound one may use amines, ethers, esters (preferably alkyl and aryl esters of aromatic carboxylic acids), or silane compounds (alkyl-/aryl silanes). A few particular examples are the methyl and ethyl esters of benzoic, toluic and phthalic acid, isobutyl esters of phthalic acid, triethoxysilane, etc.

The sequence in which the donor is added seems to be very important for the catalyst component according to the invention. In prior art the donor has always been added to the carrier before the titanation and such catalyst components give very poor results in polymerizing 1-butene, producing very poor and bad looking poly-1-butene, which can be seen from the comparative examples.

The presence of the external electron donor during the first titanation step affects highly the properties of the polymer and also the reactivities of different comonomers. With the catalyst components according to the invention the distribution of block and random 1-butene-propylene copolymers differs in a very significant way from catalyst components of prior art. With this new non-layer from the block:random ratio was 0,9:1 when with known catalysts the ratio was 7,5:1.

It is further possible to use Lewis bases and electron donors which are particularly appropriate to be used in the manufacturing of heterogeneous catalysts. These compounds are able to complex Mg and Ti derivatives, and they may be either the same or different compounds as used together with Al alkyl. It is possible in the manufacturing of the catalyst components of the invention to use any electron donor compound which is able to form a complex with an Mg or Ti derivative.

The catalyst component manufactured by the procedure of the invention may then be used to form a catalyst for olefin polymerization by allowing it to come into contact with an aluminum compound and an external electron donor, which have been mixed at least a couple of minutes in advance, the molar proportion between the electron donor and the aluminum compound being less than 1, and the Al/Ti molar proportion being 10-300, depending on the polymerization system used. The polymerization can be carried out either in a slurry, in a bulk or in a gas phase.

This new catalytic system is particularly suitable for polymerization of 1-butene, but also for many other polymerization processes of olefins, e.g. ethylene, propylene, 4-methyl-1-pentene, butadiene, isoprene, as well for copolymers of the said monomers and copolymers of 1-butene with isobutene. Alphaolefins are preferred.

Catalysts mentioned in the prior literature produce stereoregular polypropylene at a high yield, but when these catalysts are used for polymerization of 1-butene in a suspension process in an aliphatic hydrocarbon, the polymer that is produced tends to swell by effect of the fluid medium used, whereby the handling of the end product is hampered by its gel character.

The transformation of the crystal form of polybutene is usually influenced by copolymerizing 1-butene with another alpha olefin, usually with propylene. In earlier procedures, the polymerizations were carried out with both monomers simultaneously present in a given constant proportion, as is disclosed for instance in the GB publication No. 1,084,953. According to this publication, only such mixed polymers undergo rapid transformation of crystal structure in which the propylene is uniformly distributed.

In the polymerization procedure of this invention, the combination of the selected catalyst, the hydrocarbon used for reaction fluid and the polymerizing phases, produces a polymer having both a high degree of isotacticity and fast rate of crystal transformation, which has not been possible in any procedure of prior art. Particularly the transformation of the crystal form of polybutene to the stable hexagonal crystal form is very rapid and takes only a few minutes, while normally in prior art processes it may take hours.

In addition, the procedure is extremely simple, no deactivation and washing out of catalyst from the product being necessary.

The hydrocarbon used for polymerizing medium in the procedure of the invention has a great significance. Usually in polymerizing, hexane or heptane have been employed. The polymer obtained as product is then gel-like, which impedes the handling of the product. Theoretically the swelling and dissolving of a polymer can be reduced by lowering the polymerization temperature, by increasing the molecular weight of the polymer or by choosing a proper polymerizing medium.

A suitable polymerizing medium can be chosen by using the difference in the solubility parameters of the polymer and the monomer-polymerizing medium. The bigger this difference is, the less will the polymer swell or dissolve. Use of propane or also isobutane as fluid medium will result in minimal gelification.

Furthermore, the morphology of the catalyst component influences the swelling properties. The new nonlayer form of catalyst component according to the invention is particularly suited for a catalyst for poly-1-butene polymerization.

A third critical factor in the procedure of the invention is the way in which the polymerization is carried out. It is essential in the present procedure that in the first phase a small quantity of an olefinic monomer containing 2, 3, 4, 5 or 6 carbon atoms, preferably propylene, is introduced in the polymerizing reactor as monomer, whereupon the temperature to be used may rise as high as 70° C. The polymerizing time in this first phase is 1-20 min. and the monomer quantity to be supplied into the reactor is then not more than 30% and not less than 1% of the quantity of the end product.

In the second phase, 1-butene is introduced as monomer in the reactor, and the polymerizing temperature is now substantially lower than in the first phase. As long as there is still alpha olefin in the reactor which has not reacted, the temperature is kept below 30° C., preferably below 20° C. Hereby, a mixed polymer is produced in the reactor, in which at first the propylene contribution is dominant but falls rapidly as the propylene is used up. Homopolymerization of 1-butene will then continue, and the temperature may be somewhat raised, yet not higher than 45° C. The polymer produced at higher temperatures tends to cake; on the other hand, the catalyst components used in the procedure of the invention have such high activity that satisfactory yields are obtained even at lower temperatures. The polymerizing time in the second phase may vary between 30 minutes and several hours.

The residence time is usually minimized in order to achieve maximum production rate. Using the catalytic system of this invention the most suitable residence time in the reactor is 4-5 hours as the catalyst activity half-life is 2.2 hours assuming first order deactivation behavior. The molar mass of the polybutene polymer may be regulated, as is well known in the art, by introducing small amounts of hydrogen.

The invention is illustrated by the following examples. Solid catalyst components were prepared in an inert atmosphere. The reagents used (alcohol, electron donor, heptane) were dried and bubbled with nitrogen so that their oxygen and moisture contents were below 10 ppm.

PREPARATION OF CATALYST COMPONENTS

Catalyst components A-L, N-O

Catalyst components were prepared by placing magnesiumalkyl (20% solution in heptane) in a five-necked flask provided with a mechanical stirrer, reflux-condenser, gas supply valve and thermometer. The suspension was bubbled with nitrogen and kept under an inert atmosphere. Alkyl chloride was added from a dropping funnel at the ambient temperature. Thereafter the chlorination was accomplished with chlorine gas at the speed of 5 ml per minute.

Silicone oil was added and thereafter the alcohol was added drop by drop to the mixture at 25-35° C. The alcohol was ethanol except that in Example D 2-ethylhexanol was used, in Example K ethylene glycol was used and in Example N butanol was used. While adding the alcohol, the chlorinated precipitate became thicker. The mixture was stirred at 40° C. for 1 hour. Then the temperature was increased to 75–80° C. and the suspension was kept there over the night.

The hot suspension was transferred to excess of cold TiCl$_4$ (−25° C.) slowly by siphoning, allowing the reaction intermediate to precipitate in the cold TiCl$_4$. Then the mixture was allowed to warm up to the room temperature. Diisobutylphthalate was introduced as the electron donor except Example O where ethyl benzoate was used. The temperature was increased to 100–110° C. and the mixture was kept there for 1 hour. After sedimentation of the precipitate the solution was transferred by siphoning. Another portion of TiCl$_4$ in excess was added and the mixture was stirred at 110° C. for 1 hour. After sedimentation of the precipitate and siphoning of the solution, the completed catalyst component was washed with heptane several times (5–6 times at 80° C.) and dried in a slight vacuum.

Catalyst components Q–V

Catalyst components were prepared by mixing 300 ml butyloctylmagnesium (20% solution in heptane) and 200 ml heptane in a five-necked flask provided with mechanical stirrer, reflux condenser, gas supply valve and thermometer. Chlorine-gas (about 6/1) was added for 30 min. The temperature was kept below 30° C. The gas supply was controlled by rotameter. The unreacted chlorine gas was removed by bubbling N$_2$ through the system for 30 min. The mixture was heated to 90° C. and 36 ml EtOH was introduced to the warm chlorinated mixture of the carrier. The mixture was heated under agitation for 10 min. The product was washed 2–4 times with heptane. The heptane was removed by siphoning.

600 ml silicone oil and 36 ml EtOH was added. The temperature was raised to 100° C. The mixture was kept at 100°–110° C. for 2 hours under agitation. During this procedure a dispersion of carrier-EtOH adduct was obtained. The dispersion was transferred by siphoning slowly into a cold (−20° C.) solution of 700 ml TiCl$_4$ and 300 ml heptane. The mixture was allowed to warm up very slowly to the room temperature and then 5 ml di-isobutyl phthalate was added. The mixture was heated to 110° C. and kept there for 1 hour. After sedimentation of the precipitate the solution was transferred by siphoning. 800 ml TiCl$_4$ was added and the mixture was heated to 110° C., 1 hour. The solid was again left to precipitate and the solution was removed by siphoning. After this treatment the brown powder obtained was washed thoroughly with warm heptane. The catalyst component was introduced by a siphon into a 3-necked flask and dried in N$_2$ stream 1 hr with shaking.

COUNTEREXAMPLES

Catalyst component M

A comparative catalyst component was prepared in the same way as catalyst components A–L except that instead of chlorine gas hydrogen chloride was used as second chlorination agent.

Catalyst component P

A comparative catalyst was prepared in the same way as catalyst components A–L except that electron donor was added after the second titanation step.

Catalysat component X

A comparative catalyst component was prepared by using hydrogen chloride as chlorinating agent, electron donor treatment before titanation and the titanation was carried out in one step. 70 cm$^3$ of dry n-heptane was placed into a three-necked flask. To the flask was then added 18 cm$^3$ of a solution of dibutylmagnesium in n-heptane. The contents of the flask were stirred and 100 cm$^3$ of dry hydrogen chloride was adder as a chlorinating agent. The chlorination was repeated three further times. The reaction mixture was stirred at ambient temperature (about 20° C.) for one hour. The product was allowed to settle and was then washed four times with 100 cm$^3$ of n-heptane. The solid material was suspended in 100 cm$^3$ of n-heptane.

To this suspension 1 cm$^3$ of ethyl benzoate and 80 cm$^3$ of n-heptane was added. The mixture was stirred overnight at ambient temperature. 100 cm$^3$ of heptane was added and then the mixture was filtered. The solid residue was washed once with 100 cm$^3$ of n-heptane.

The solid residue obtained was mixed with 100 cm$^3$ of titanium tetrachloride and the mixture was heated at 80° C. for 2 hours. The solid product was then filtered and was washed four times at 80° C. with 100 cm$^3$ of n-heptane. The product obtained was slurried in 50 cm$^3$ of n-heptane.

Catalyst component Y

A comparative catalyst component was prepared by using SiCl$_4$ as chlorinating agent, electron donor treatment before titanation and the titanation was carried out in one step. 17 g Mg (n-C$_4$H$_9$)$_2$ in 240 ml n-heptane was introduced to 20 ml of solution containing 22 g SiCl$_4$ and 4 g ethylbenzoate at room temperature with stirring for 10 min. The temperature was raised to 95° C., and kept there for 2 hours. 22 g SiCl$_4$ was added and heated for 2 hours. The white precipitate formed by cooling was washed with n-heptane.

After filtration the precipitate was treated with 240 ml boiling TiCl$_4$ for 2 hours. The hot solution was filtrated and the precipitate was washed with cold n-heptane and dried in vacuum.

Catalyst component Z

A comparative catalyst component was prepared by using tert-butyl chloride as chlorinating agent. The titanation was carried out in one step. 70 ml dibutylmagnesium and 40 ml diisoamylether were introduced into a reactor at ambient temperature. The reactor was heated to 50° C. and 90 ml tert-butylchloride were added drop by drop during 2 hours. After the addition the mixture was kept at 50° C. for 2 hours and then the precipitation was washed at the same termperature with n-hexane. 1 ml ethylbenzoate was introduced at 50° C. The mixture as agitated for 1 hour at 50° C., after which the temperature was increased to 80° C. to remove hexane with nitrogen. 120 ml titanium tetrachloride was added and the mixture was agitated for 2 hours at 80° C. The solid catalyst component was washed with n-hexane at 50° C.

The preparation and the properties of the catalyst components above are presented in TABLE 1.

The silicone oil is used in an amount of above 40 weight % in relation to the starting materials excluding solvents.

TABLE 1
PREPARATION OF SOLID Ti—CONTAINING CATALYST COMPONENTS

| No. of cat. | R₂Mg (ml) | Chlorination T (°C.)\|t(min) | Silicon oil (ml) | Alcohol (ml) | Donor (ml) | TiCl₄ (ml) | Composition of catalyst component (%) Ti | Mg | Cl |
|---|---|---|---|---|---|---|---|---|---|
| A | 12 (BOMAG) | BuCl, 30–60° C. Cl₂ 60\|90 | 450 | | 12,5 | 0.95 | 200 200 | 4,4 | 17,4 | 59,2 |
| B | 12 (BEM) | BuCl, 25° C. Cl₂ 60\|30 | 200 | 100 | 4,5 | 0,47 | 300 150 | 6,0 | — | — |
| C | 12 (BOMAG) | BuCl, 25° C. Cl₂ 60\|20 | 200 | 200 | 19.0 | 0.95 | 400 200 | 4.8 | 16,1 | 59,4 |
| D | 12 (BOMAG) | BuCl, 25° C. Cl₂ 58\|40 | 200 | 200 | 47.0 (EHA) | 1.95 | 200 200 | 3.5 | 12,7 | 47,5 |
| E | 12 (BOMAG) | PeCl, 25° C. Cl₂ 25–62\|30 | 200 | 200 | 20.0 | 1.95 | 400 200 | 4.8 | 11,4 | 45,2 |
| F | 24 (BOMAG) | BuCl, 30° C. Cl₂ 30\|80 | 400 | 400 | 32.0 | 2.90 | 800 800 | 2.3 | 12,9 | 47,1 |
| G | 12 (BOMAG) | BuCl, 30° C. Cl₂ 62\|30 | 200 | 200 | 19,0 | 1,90 | 400 400 | 2,1 | 14,4 | 52,3 |
| H | 12 (BEM) | BuCl, 30° C. Cl₂ 47\|30 | 200 | 200 | 20.0 | 1.95 | 200 200 | 7.9 | 28,6 | 46,0 |
| I | 12 (BOMAG) | BuCl, 22° C. Cl₂ 22–60\|30 | 200 | 200 | 20.0 | 6.00 | 400 200 | 8.6 | 5,9 | 42,1 |
| J | 24 (BOMAG) | BuCl, 30° C. Cl₂ 30\|45 | 400 | 400 | 32.0 | 2.90 | 800 800 | 3.8 | 15,6 | 52,4 |
| K | 12 (BOMAG) | BuCl, 20° C. Cl₂ 20–30\|80 | 200 | 200 | 4,5 (EG) | 0,95 | 200 200 | 8,2 | 15,5 | 55,0 |
| L | 12 (BOMAG) | BuCl, 20° C. Cl₂ 20–30\|20 | 200 | 200 | — | 1,45 | 400 200 | 3,3 | 10,8 | 54,8 |
| M | 12 (BOMAG) | BuCl, 20° C. HCl 20–34\|20 | 200 | 200 | 14,0 | 1,45 | 400 200 | 3,8 | 16,8 | 54,7 |
| N | 12 (BOMAG) | BuCl, 30° C. Cl₂ 60\|20 | 200 | 200 | 27,0 BuOH | 7,3 | 200 200 | 4,0 | 16,2 | 41,5 |
| O | 12 (BOMAG) | BuCl, 30° C. Cl₂ 58\|30 | 200 | 200 | 20,0 | 2,2 EtOBz | 200 200 | 8,7 | 32,0 | 53,6 |
| P | 12 (BOMAG) | BuCl, 30° C. Cl₂ 47\|30 | 200 | 200 | 20,0 | 1,95 | 200 200 | 7,7 | 9,3 | 47,3 |
| Q | 300 (BOMAG) | Cl₂, 30\|30 | | 600 | 72 | 4,8 | 700 800 | 2,7 | 12,3 | 45,3 |
| R | 300 (BOMAG) | Cl₂, 31\|31 | | 600 | 72 | 4,8 | 700 800 | 3,2 | 13,6 | 50,9 |
| S | 300 BOMAG | Cl₂, 15–40\|24 | | 600 | 72 + 45 | 3,8 | 700 700 | 5,3 | 12,4 | 49,4 |
| T | 300 (BOMAG) | Cl₂, 20–38\|21 | | 600 | 76 | 3,8 | 700 700 | 4,2 | 11,7 | 53,3 |
| U | 300 (BOMAG) | Cl₂, 16–24\|60 | | 600 | 72 + 15 | 3 | 700 750 | 3,2 | 14,1 | 53,4 |
| V | 310 (BOMAG) | Cl₂, 31\|40 | | 600 | 72 | 4,8 | 750 800 | 2,8 | 12,0 | 42,6 |
| X | 18 (Bu)₂Mg | HCl, 20\|60 | 100 | — | — | 1 EtOBz | 100 | 5,1 | 16,0 | 52,6 |
| Y | 17 g (Bu)₂Mg | SiCl₄, 95\|120 | 22 g + 22 g | — | — | 4 g EtOBz | 240 | 3,4 | 21,0 | 67,0 |
| Z | 70 (Bu)₂Mg | tertBuCl,50\|240 | 90 | — | — | 1 EtOBz | 120 | 2,0 | 19,0 | 54,7 |

EXPLANATIONS:
BOMAG butyloctylmagnesium
BEM butylethylmagnesium
BuCl butylchloride
PeCl pentylchloride
Donor di-isobutylphtalate
Alcohol ethanol
EG ethylene glycol
EHA 2-ethylhexanol
BuOH butanol
EtOBz ethylbenzoate

POLYMERIZATION OF PROPYLENE

Examples 1–5, 7–15

Polymerizations of propylene by using catalyst components prepared as mentioned in TABLE 1, were carried out in a heptane slurry in the following way.

Into a polymerization reactor containing 700 ml dry heptane was introduced the catalyst which was prepared by mixing the aluminum alkyl compound, for instance triethylaluminum and, a Lewis alkali, for instance diphenyldimethoxysilane, in the Al:donor molar ratio of 20 in 50 ml heptane, into which after 5 minutes was added the catalyst component prepared as above so that the Al:Ti molar ratio will be 200. The polymerization was accomplished under the following conditions: propylene partial pressure 9.0 bar, hydrogen partial pressure 0.3 bar, temperature 70° C. and polymerization time 3 hours.

Example 6

Polymerizations in liquid monomer were carried out in the following way:

The catalyst was prepared as described in Examples 1–5, 7–15 and this catalyst was introduced into a cold polymerization reactor. 0.1 bar hydrogen was added (the amount was controlled by utilizing the partial pressure of hydrogen). 900 g propylene was introduced as liquid. The reactor was heated to 70°-80° C. and kept there for 120 minutes. After that time the remaining propylene was flashed out.

COUNTEREXAMPLES

Examples 16-17

Polymerizations of propylene were carried out according to Examples 1-5, 7-15 by using catalyst component M in Example 16 and catalyst component P in Example 17.

Examples 18-20

Polymerizations of propylene were carried out as in Examples 1-5, 7-15 by using catalyst components X, Y and Z, respectively.

The conditions of these polymerizations are listed in TABLE 2.

Some properties of polymers obtained are presented in TABLE 3. Isotacticity was determioned by extraction in heptane. Melt flow index (MFI) was determined according to the standard ASTM D 1238-65T and bulk density according to the standard ASTM D 1895.

The activity of the catalyst was determined as quantity of solid polymer based on one kilogram of the polymer per one gram of titanium catalyst.

It is evident from TABLES 2 and 3 that the catalyst prepared according to the invention have better properties compared to the counterexamples of catalysts prepared according to prior art. In Example 16 there was used a catalyst prepared from catalyst component M, which was obtained by using hydrogen chloride as the second chlorination agent instead of chlorine gas. The catalyst had poor activity compared to catalysts according to the invention. Example 17 shows that by adding electron donor after the second titanation a catalyst component is obtained which also gives a catalyst with very low activity in the polymerization of propylene. Examples 18-20 show clearly that polymerization by using catalysts obtained from comparative catalyst components X, Y and Z give polymers which have poor isoacticity properties compared to polymers prepared according to the invention. These catalysts have also very poor activity.

TABLE 3

| | | PROPERTIES OF POLYPROPYLENE | | | |
|---|---|---|---|---|---|
| Example | No of catalyst | Ti-content (ppm) | Isotacticity (%) | MFI 230° C., 216 kg, 10 min | Bulk-density g/ml |
| 5 | E | 4 | 97.9 | | |
| 8 | H | 2 | 97.7 | 29.8 | |
| 9 | O | 4.8 | 94.9 | | 0.36 |
| 10 | Q | 3.5 | 98.3 | 32 | 0.47 |
| 11 | R | 2.6 | | 25 | 0.46 |
| 12 | S | 3.7 | 92.8 | 17 | 0.33 |
| 14 | U | 2.1 | 90 | 46.5 | 0.35 |
| 15 | V | 2.9 | | 38 | 0.36 |
| 17 | P | 36.2 | 94.8 | | 0.27 |
| 18 | X | | 89,3 | | |
| 19 | Y | | 80,8 | | |
| 20 | Z | | 90,0 | | |

POLYMERIZATION OF 1-BUTENE AND CO-MONOMERS

Below are presented some examples which illustrate the procedure of the polymerization 1-butene. The phase transformation of the polymers prepared in the examples was monitored by evaluating the relative heights of the respective peaks of PB-1 and PB-2 in the XRD at $2\theta = 9.9°$ and $11.8°$. For measuring purposes, the samples were mixed for 10 min. in a Brabender Plasticorder at 190° C. under 200 bar pressure for 5 min., whereafter the sample was rapidly cooled to room temperature.

The degree of isotacticity was determined by measuring the part insoluble in diethylether by extracting 4-5 g of the polymer sample in 200 ml boiling diethylether for 6-7 hours.

Figure 3:
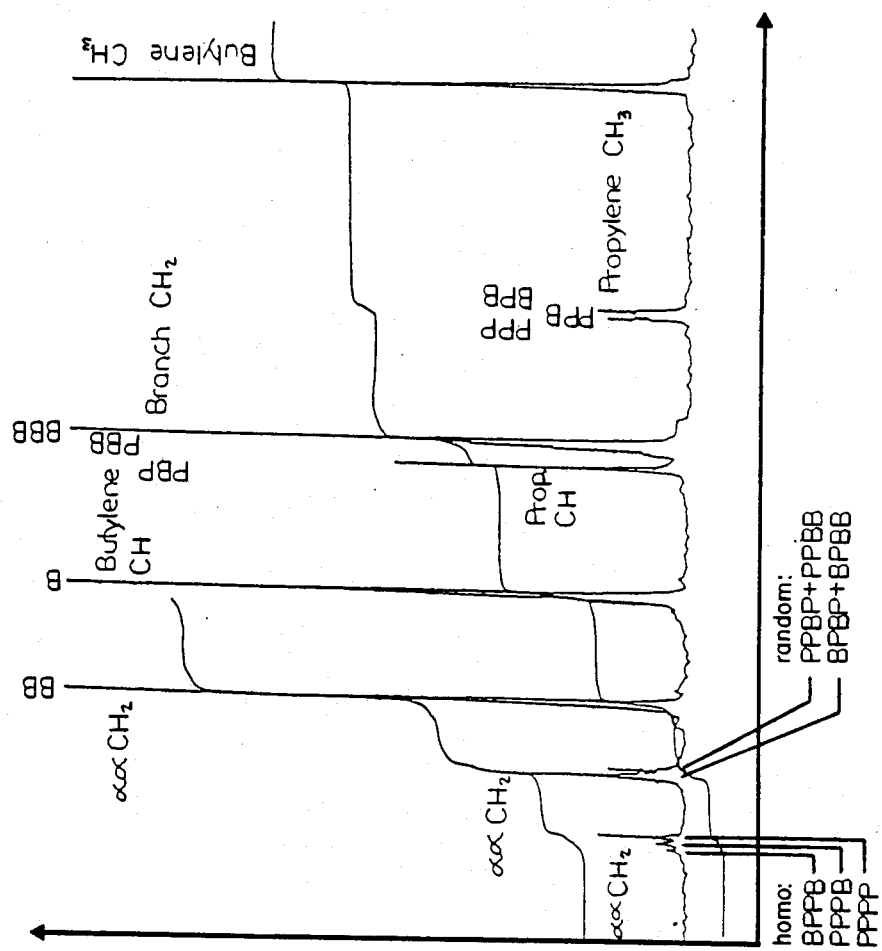
FIG. 3 shows the $^{13}C$ NMR spectrum of a copolymer of propylene and 1-butene made in accordance with the present invention.
Figure 4:
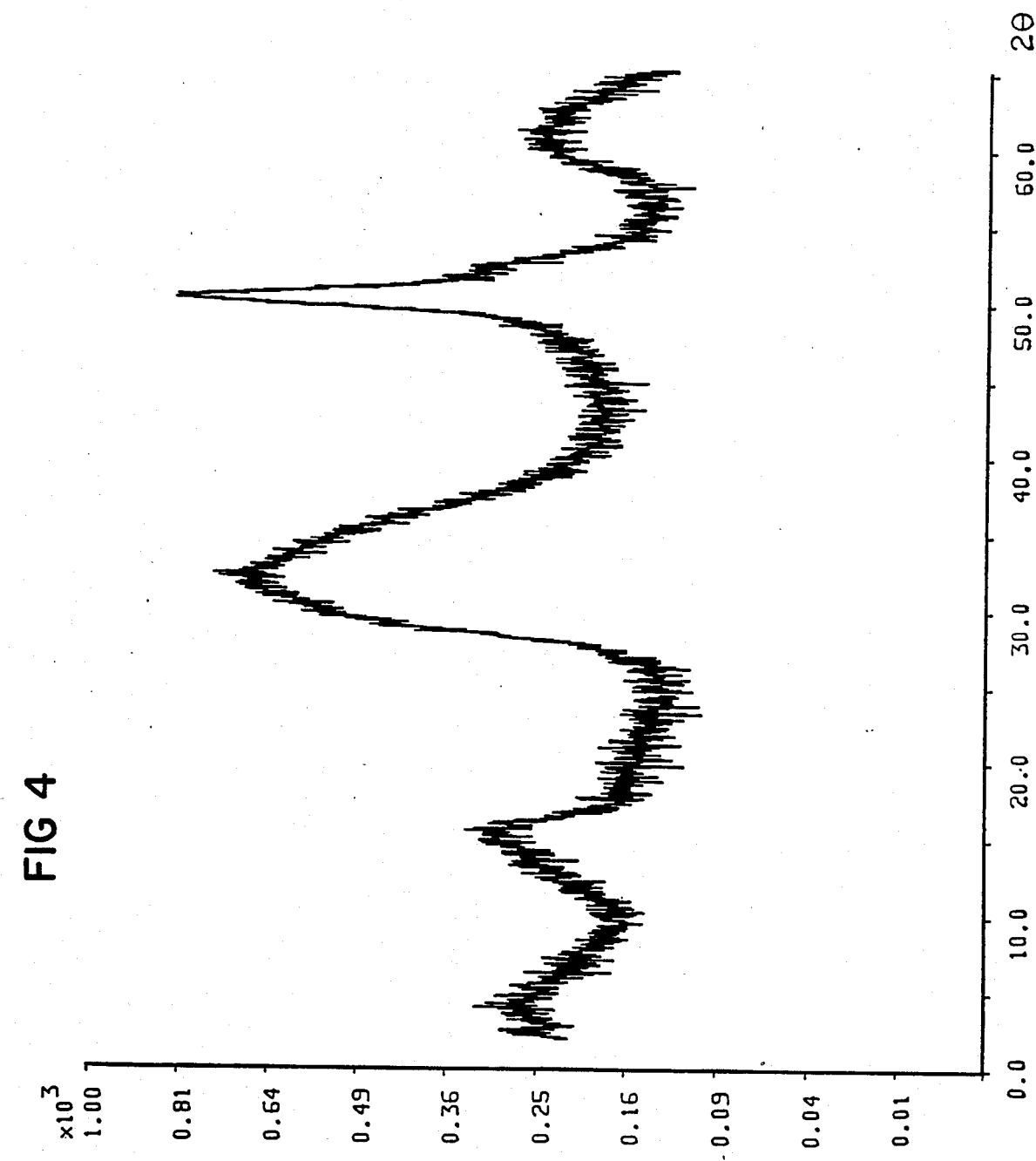
FIG. 4 shows the wide-angle X-ray diffraction spectrum of a typical catalyst made in accordance with the invention.

The proportion of propylene in the polymer was determined by $^{13}$C-NMR analysis (FIG. 3) according to (J. Polym. Sci. Polym. Phys. Ed., Vol. 21, 573-581 (1983), Anal. Chem., Vol. 49, No. 9 (1977)). In the spectrum (FIG. 3), the intensity of propylene (P) goes down in the peaks due to the homo (and block) form PPPP>PPPB>BPPB. After the propylene has been used up, its content in the mixed polymer being formed goes down: BPBP+BPBB>PPBP+PPBB.

The polymerizing runs were made in reactors of approximately 4 liters capacity and comprising a catalyst

TABLE 2

| | | POLYMERIZATIONS OF PROPYLENE | | | | |
|---|---|---|---|---|---|---|
| Example | No. of catalyst | Propylene pressure (bar) | Amount of cat. mmol/Ti | Monomer consumpt. (g) | Yield (g) | Activity kg PP/g cat. 3 h |
| 1 | A | 10,0 | 0,0313 | 521,5 | 317,2 | 9,3 |
| 2 | B | 10,0 | 0,0399 | 546,9 | 319,8 | 10,1 |
| 3 | C | 10,0 | 0,0334 | 569,5 | 355,4 | 10,7 |
| 4 | D | 9,7 | 0,0257 | 513,3 | 286,1 | 8,1 |
| 5 | E | 9,7 | 0,0414 | 476,7 | 218,1 | 5,3 |
| 6 | F | 31,3 | 0,0109 | 911,1 | 543,2 | 24 |
| 7 | H | 10,0 | 0,0631 | 524,8 | 338,1 | 8,9 |
| 8 | J | 9,7 | 0,0272 | 492,7 | 273,0 | 6,6 |
| 9 | O | 10,0 | 0,0779 | 400,0 | 162 | 4,1 |
| 10 | Q | 9,6 | 0,022 | 596,8 | 400,9 | 10,2 |
| 11 | R | 9,6 | 0,023 | 564,9 | 340,7 | 10,2 |
| 12 | S | 9,3 | 0,036 | 525,8 | 276,0 | 8,4 |
| 13 | T | 9,0 | 0,030 | 556,3 | 297,2 | 8,9 |
| 14 | U | 9,6 | 0,0235 | 606,0 | 385,4 | 11,0 |
| 15 | V | 9,8 | 0,020 | 536,5 | 298,4 | 9,0 |
| 16 | M | 10,0 | 0,0254 | 378,3 | 122,7 | 3,9 |
| 17 | P | 10,0 | 0,0710 | 367,5 | 122 | 2,5 |
| 18 | X | 9,7 | 0,0362 | 285,3 | 49,6 | 1,5 |
| 19 | Y | 9,7 | 0,0272 | 382,1 | 86,0 | 2,2 |
| 20 | Z | 10,0 | 0,0136 | 272,3 | 42,3 | 1,3 | introduction system, a supply system for liquid and gaseous monomer, a hydrogen addition system, and a system for introducing dry nitrogen. The catalyst was prepared by mixing the aluminum alkyl compound, for instance triisobutylaluminum and, a Lewis base for instance diphenyldimethoxysilane, in the Al:Lewis base molar ratio of 20 in 50 ml liquid, into which after 5 minutes is added the catalyst component prepared according to the invention so that the Al:Ti molar ratio will be 200.

The product was removed by means of a bottom tap on the reactor. In heating and control, conventional technology was applied.

The pressure in the polymerizing reactor was 3-4 bar during the initial phase and 5-6 bar in the end phase, depending on the temperatures used.

Examples 21-33

(Polymerization of 1-butene)

Into the reactor was introduced isobutane, and it was heated or cooled to desired temperature. Hydrogen was added (the quantity was controlled utilizing the partial pressure of hydrogen). The catalyst component, cocatalyst and Lewis alkali were introduced by aid of nitrogen pressure in the reactor and 0-50 g propylene were added. The propylene was allowed to react for 10-30 min. After the first phase, the discharge valve was opened on the cover of the reactor, whereby the hydrogen and any propylene that had not reacted could evaporate.

The desired reaction temperature of the second phase was regulated, hydrogen and 1-butene were added.

The reaction time was 2 hours. The polymers were usually left overnight in the reactor, whereafter the bottom valve was opened and the contents of the reactor were discharged to atmospheric pressure. The polymer was dried and analyzed as described above. The conditions in these tests are given in Table 4.

When the reaction temperature was lowered to about 30° C., preferably to 28° C., the product is granular or a free flowing powder with little caking tendency. This procedure had no effect on the crystal transform.

TABLE 4

POLYMERIZING CONDITIONS FOR THE TWO-PHASE POLYMERIZATIONS OF 1-BUTENE

| Example No. | Catalyst No. | Ti—catalyst mmol | Phase I isobut. g | prop. g | temp. °C. | time min | flash min | Phase II 1-but. g | $H_2$ bar | temp. °C. | Yield | Activity kg PB/g cat | I.I % |
|---|---|---|---|---|---|---|---|---|---|---|---|---|---|
| 21 | C | 0.1158 | 1500 | 50 | 20 | 30 | 3 | 150 + 350 | — | 20 | 342 | 2.96 | 93.5 |
| 22 | F | 0.049 | 1500 | 50 | 20 | 30 | 3 | 100 + 300 | — | 20 | 251 | 2.45 | 98.8 |
| 23 | F | 0.0473 | 1800 | 25 | 20 | 25 | 3 | 100 + 300 | — | 28 | 248 | 2.51 | 99.6 |
| 24 | F | 0.0458 | 1300 | 25 | 20 | 10 | 3 | 100 + 300 | — | 23 | 118 | 1.24 | 99.6 |
| 25 | F | 0.0521 | 1500 | 25 | 30 | 25 | 3 | 100 + 300 | — | 30 | 200 | 1.83 | 99.3 |
| 26 | F | 0.0591 | 1565 | 25 | 35 | 25 | 3 | 100 + 300 | — | 35 | 107 | 0.87 | |
| 27 | F | 0.0516 | 1554 | 25 | 40 | 20 | 3 | 100 + 250 | — | 40 | 212 | 1.97 | 98.4 |
| 28 | F | 0.050 | 600 | 25 | 28 | 20 | 8 | 1500 | 0.1 | 28 | 567 | 5.44 | 99.7 |
| 29 | F | 0.0513 | 360 | 25 | 26 | 20 | 8 | 1500 | 0.1 | 27 | 121 | 1.13 | 98.0 |
| 30 | G | 0.0465 | 1500 | 50 | 20 | 30 | 3 | 100 + 300 | — | 20 | 143 | 1.35 | |
| 31 | G | 0.044 | 1500 | 50 | 20 | 30 | 3 | 100 + 300 | — | 22 | 69 | 0.69 | |
| 32 | H | 0.1705 | 1200 | 50 | 32 | 30 | 5 | 100 + 300 | 0.1 | 36 | 506 | 4.9 | 89.3 |
| 33 | I | 0.1323 | 600 | 25 | 28 | 20 | 8 | 1500 | 0.1 | 28 | 152 | 1.42 | |

Hydrogen pressure in phase 1 0.1 bar $H_2$.
Polymerizations are left over night, except in example 30, where it was 4 hours.

EXAMPLES 34-39

Polymerization was carried out as in Examples 21-33 except that there was no intervening evaporation of hydrogen and propylene after phase 1. A mixed polymer is produced in which the content of propylene decreases as it passes from the monomer mixture until it is used up. This phase takes 20-30 min. as followed by the pressure gauge.

In phase 3, after all propylene has been used, pure polybutene is produced. After the reaction, the bottom valve is opened and the product is dried and processed as described above.

These reaction conditions are presented in the following TABLE 5. When the polymerization runs are carried out in this manner using a suitable catalyst, the product obtained will be easy to handle, a granular powder with a bulk density of 0.38 g/ml. In addition, the crystal transformation is rapid, taking only 10-120 min. It is followed by X-ray diffraction measurements. Certain physical properties of the polymers prepared in Examples 21-28, 29, 32 and 35-37 are presented in Table 6 below.

TABLE 5

POLYMERIZING CONDITIONS FOR THREE-PHASE POLYMERIZATIONS OF 1-BUTENE

| Example No. | Catalyst No. | Ti—catalyst mmol | Phase I isobut. g | prop. g | temp °C. | Phases II + III time min | 1-butene g | temp. | Yield g | Activity kg PB\|g cat | I.I % |
|---|---|---|---|---|---|---|---|---|---|---|---|
| 34 | F | 0.0638 | 1500 | 50 | 20 | 40 | 4 × 100 | 20 | 511 | 3.84 | 97 |
| 35 | F | 0.0502 | 1600 | 50 | 35 | 10 | 100 + 300 | 25 | 155 | 1.48 | 93 |
| 36 | F | 0.0547 | 1400 | 25 | 30 | 10 | 100 + 350 | 30 | 375 | 3.29 | 96 |
| 37 | F | 0.051 | 1600 | 25 | 30 | 5 | 100 + 350 | 30 | 265 | 2.49 | 97 |
| 38 | I | 0.1314 | 1400 | 25 | 30 | 10 | 100 + 350 | 28 | 107.8[a] | 1.01[a] | |
| 39 | J | 0.0853 | 600 | 25 | 28 | 20 | 1500 | 28-48 | 878 | 7.4 | |

Hydrogen pressure 0.1 bar.
Polymerization time is over night.
[a]Polymerization time is 6 hours.

TABLE 6

SOME PHYSICAL DATA FROM THE POLYMERIZATION RUNS OF EXAMPLES 21-37

| Example No. | residue ppm | $M_w/M_n$ | MI g/10 min 2,16 190° C. | Bulk density g/cm3 | Prop. in the polymer w % total | block | random | Phase transf. time | Stable crystal form Tm, °C. | cryst. deg % |
|---|---|---|---|---|---|---|---|---|---|---|
| 21 | 18.5 | 12 | | | 11 | 7 | 4 | 4 days | 120 | 24 |
| 22 | 12.8 | 10 | | | 15 | 6 | 9 | | 123 | 37 |
| 23 | 11.3 | 8 | | 0.36 | 6 | 2 | 4 | 2 weeks | 127 | 41 |
| 24 | 19.5 | 7 | | | 14 | 5 | 9 | 1 week | 124 | 39 |
| 25 | 14.2 | 8 | | 0.28 | 10 | 4 | 6 | 3 weeks | 123 | 36 |
| 26 | 24.3 | 6 | | | 10 | 6 | 4 | 2 weeks | 131 | 44 |
| 27 | 8.2 | 8 | | | 6 | 2 | 4 | 1 week | 124 | 30.5 |
| 28 | 2.4 | 14 | 0.9 | 0.39 | | | | 1 week | 126 | 42 |
| 29 | | 11 | 1.4 | | | | | 1 week | 127 | 47 |
| 32 | 6.2 | 8 | 0.6 | | 10 | 4 | 6 | 1 day | 124 | 52 |
| 35 | | | | | 37 | 18 | 19 | | | |
| 36 | | 10 | 1.8 | | 15 | 5 | 10 | 3-4 h | 122 | 40 |
| 37 | | 6 | 0.6 | | 19 | 7 | 12 | 15-20 min | 122 | 43 |

TABLE 7

POLYMERIZATION CONDITIONS FOR HOMOPOLYMERIZATIONS OF 1-BUTENE IN LIQUID POOL

| Example No | Ti—catalyst No. | mmol | 1-butene g | $H_2$ bar | temp. °C. | time h | yield g | activity kg PB\|g kat. | I.I % | MFI g/10 min. 2.16, 190° C. |
|---|---|---|---|---|---|---|---|---|---|---|
| 40 | F | 0.060 | 1500 | 0.1 | 20 | | 118 | 0.92 | 98.6 | 1.0 |
| 58 | A | 0.1038 | 1500 | 0.1 | 40 | 4 | 80 | 0.7 | | |
| 59 | B | 0.1225 | 1341 | 0.1 | 40 | 4 | 86 | 0.78 | | |

EXAMPLE 40

Into the reactor the monomer, 1-butene, was introduced, and it was heated or cooled to desired temperature. Hydrogen was added. The catalyst component, cocatalyst and Lewis base were introduced by aid of nitrogen pressure in the reactor: the reaction time was 4 hours, whereafter the bottom valve was opened and the contents of the reactor were discharged. The polymer was dried and analyzed as described above.

The conditions in this test are given in Table 7 above.

EXAMPLE 41-50

The polymerizations were carried out as in Example 40, except that isobutane was used as polymerizing medium. Hydrogen pressure was 0.1 bar. These reaction conditions are presented in Table 8.

When the polymerization runs are carried out in this manner using a suitable catalyst and a proper ratio of the monomer to the polymerizing medium, the product obtained will also be easy to handle, a free flowing powder.

In counterexamples 48-50, where catalyst components X, Y and Z according to prior art were used, the polymer obtained was not free flowing powder. A hard gel in a low amount was obtained.

EXAMPLE 51

Into the reactor were introduced 1500 g isobutane, 50 g propylene and 100 g 1-butene. The reaction temperature was 25° C. and hydrogen was added (5 bar). 0.1033 mmol catalyst component A, tri-isobutyl aluminum (TIBA) and diphenyldimethoxysilane (Al:Ti=200, Al:Lewis base=20) were added by aid of nitrogen pressure. The propylene and 1-butene were allowed to react for 60 min. Then the discharge valve was opened on the cover of the reactor, whereby hydrogen and any propylene and 1-butene that had not reacted could evaporate.

The reaction temperature was set to 20° C., and 400 g 1-butene were introduced and hydrogen (0.1 bar) was added. The polymerization was left overnight, whereafter the reactor was discharged, and the polymer was dried and analyzed as described above. The activity was 0.8 kg PB/g catalyst with isotactic index 95.7%.

EXAMPLE 52

Into the reactor was introduced 1500 g butadiene, and it was heated to 35° C. Hydrogen, 0.1 bar, was added. 0.0473 mmol catalyst component F, TIBA (Al:Ti=20) and diphenyldimethoxysilane (Al:Lewis base=20) were introduced by aid of nitrogen pressure.

TABLE 8

POLYMERIZING CONDITIONS FOR SLURRY HOMOPOLYMERIZATIONS OF 1-BUTENE

| Example No. | Ti—catalyst No | mmol | Isobutane g | 1-Butene g | Temperature °C. | Time h | Yield g | Activity kg PB/g cat. | 1.1 % | Bulk den g/ml |
|---|---|---|---|---|---|---|---|---|---|---|
| 41 | F | 0.0554 | 900 | 940 | 28 | | 648 | 5.62 | 95.7 | |
| 42 | F | 0.0553 | 980 | 1010 | 28 | 6 | 115,6 | 1.0 | 97.8 | |
| 43 | F | 0.0535 | 500 | 1500 | 28 | 6 | 757.2 | 6.79 | 98.7 | |
| 44 | Q | 0.011 | 750 | 750 | 28 | 4 | 54 | 2.9 | 97.4 | 0.36 |
| 45 | R | 0.016 | 750 | 750 | 28 | 4 | 40 | 1.7 | 94.7 | 0.36 |
| 46 | S | 0.041 | 750 | 750 | 28 | 4 | 63 | 1.7 | 96.9 | 0.25 |
| 47 | V | 0.017 | 750 | 750 | 28 | 4 | 42 | 1.5 | 95.9 | 0.33 |
| 48 | X | 0,0326 | 750 | 750 | 28 | 4 | 2 | 0,02 | | |
| 49 | Y | 0,0745 | 750 | 750 | 28 | 4 | 76 | 0,7 | | |
| 50 | Z | 0,0434 | 750 | 750 | 28 | 4 | 30,5 | 0,3 | | |

The polymerization was left overnight. The yield was 17.2 g polybutadiene.

EXAMPLE 53

Into the reactor was 1300 g isobutane introduced and it was heated to 32° C. 0.1 bar hydrogen was added. 0.0491 mmol catalyst component F, cocatalyst and Lewis base, as in Example 43, were introduced by aid of nitrogen pressure. 25 g isobutene were added. The isobutene was allowed to react for 30 min. Then 400 g 1-butene were added to the reactor. The reaction temperature was kept at 28° C. in this step, and the product was left overnight in the reactor. The yield was 72 g, which means 0.7 kg polymer/g cat. The material insoluble in diethylether was 98.6%. The product was a granular powder.

EXAMPLE 54

Into the reactor 1500 g isobutane were introduced. The temperature was 26° C. Hydrogen was added (0.1 bar). 0.0525 mmol catalyst component F, cocatalyst and Lewis base, as in Example 43, were introduced. 25 g ethylene were added. The ethylene was allowed to react for 30 min. Then 100+436 g 1-butene were added. The reaction temperature was 28° C. and the polymerization was left overnight. The yield was 127.2 g, which means 1.16 kg copolymer/g catalyst.

EXAMPLE 55

Into 1 1 reactor 300 ml heptane were introduced. Hydrogen was added (0.1 bar). 36×4 mg catalyst component F, cocatalyst and Lewis base, as in Example 43, were introduced. 33 g 4-methyl-1-pentene were added. The polymerization temperature was 50° C. and reaction time was 120 min. The yield of white polymer was 21 g.

COUNTEREXAMPLE 56

A comparative catalyst component was prepared according to prior art by using magnesium dichloride as starting material for the solid Ti-containing catalyst compound.

50 g of anhydrous magnesium chloride, 80 g of anhydrous ethyl alcohol were introduced into a 2 liter autoclave. The reaction mass was heated to 120° C. with stirring and an adduct was obtained of $MgCl_2$ with 3 moles of ethyl alcohol, which melted.

The dispersion was collected in a stirred 5 liter flask containing 2,5 liters of anhydrous heptane cooled to −40° C. The solid product was separated by decanting and filtering and washed with heptane and dried.

The product was suspended in 80 ml of anhydrous n-heptane and 200 ml of triethyl aluminum in heptane. The mixture was heated to 80° C. for 2 hours. Thereafter the mixture was filtered and then washed five times with 100 ml of n-heptane at 80° C. The product was suspended in 100 ml of n-heptane and into this suspension was added 8 ml of a heptane solution containing 1 g of ethyl benzoate and heated to 80° C. for 2 hours. The mixture was then filtered and washed 5 times with 100 ml of heptane at 80° C. The mixture was then filtered and dried under vacuum at 45° C.

To the $MgCl_2$ was added 80 ml of $TiCl_4$ under stirring and the mixture was heated at 110° C. for 2 hours. The product was then filtered and the treatment was repeated with 100 ml of $TiCl_4$ for 2 hours, also at 110° C. The product was then filtered cooled to 80° C. and then washed with heptane at 80° C. and dried under vacuum at 45° C.

COUNTEREXAMPLE 57

Another comparative catalyst component according to prior art was prepared by using magnesium dichloride as starting material for the solid Ti-containing catalyst compound.

30 g of anhydrous $MgCl_2$ and 50 g of anhydrous ethanol and 100 ml of silicone oil and 100 ml of mineral oil were introduced into a flask at 120° C. with stirring until all the $MgCl_2$ was dissolved.

The $MgCl_2$ adduct with ethanol was thus formed. The hot mixture was maintained at 120° C. and stirred and then discharged into 1000 ml of n-heptane which was kept under stirring and cooled so that the final temperature did not exceed 0° C. The $MgCl_2.3EtOH$ microspheres obtained after filtering were dried under vacuum. The adduct was activated as in Example 57.

The polymerizatin of Examples 21–33 were repeated by using catalysts according to comparative Examples 56 and 57. The difference between a typical catalyst component according to prior art and the catalyst component according to the invention can clearly be seen from Tables 9 and 10. With the catalyst component according to the invention the block:random ratio was 0.9:1 when with known catalysts the ratio was 7.5:1, as can be seen from Table 10.

TABLE 9

| | | | | COMPARATIVE TWO-PHASE POLYMERIZATIONS | | | | | | | | | | | |
| | | | | Phase I | | | | Phase II | | | | | | | |
| Test run | Catal. Examp. | Ti—cat mmol | Isobut. g | prop. g | temp. °C. | time min | flash min | $H_2$ bar | isobut. g | 1-but g | $H_2$ bar | temp. °C. | Yield g | Act. kg PB/g. cat | I.I % |
| a | 56 | 0.076 | 700 | 20 | 40 | 20 | 5 | 2.5 | 300 | 200 | 0.5 | 20–40 | 172 | 1.1 | 89 |
| b | 56 | 0.076 | " | 40 | " | 30 | 5 | " | 1300 | 300 | " | 30 | 110 | 0.7 | 92 |
| c | 56 | 0.064 | " | 20 | " | " | 5 | " | 600 | " | " | 25–45 | 320 | 2.3 | 75 |
| d | 56 | 0.050 | " | 30 | " | " | 5 | 5.0 | " | " | 0.2 | 30 | | | |
| e | 57 | 0.0738 | 1500 | 25 | " | 60 | 5 | 1 | | 500 | 0.1 | 20 | 557 | 5.5 | 95.4 |
| f | 57 | 0.0753 | " | 50 | 50 | " | 5 | " | " | " | " | " | 420 | 4.1 | 91.5 |
| g | 57 | 0.075 | 1280 | 100 | " | " | 5 | " | " | " | " | " | 543 | 5.5 | 90.7 |
| h | 57 | 0.076 | 0.076 | 1500 | 50 | " | 5 | " | " | " | " | " | 389 | 3.7 | 94.8 |

TABLE 10

DISTRIBUTION OF BLOCK TO RANDOM (mol % ratio) COPOLYMERS

| Example No. | Catalyst No. | mol % PP, total | wt % PP, total | block:random mol % |
|---|---|---|---|---|
| 21 | C | 14 | 11 | 9:5 |
| 32 | H | 13 | 10 | 6:7 |
| 23 | F | 8 | 6 | 3:5 |
| 24 | F | 18 | 14 | 7:11 |
| 25 | F | 13 | 10 | 6:7 |
| 26 | F | 13 | 10 | 7:6 |
| 27 | F | 8 | 6 | 3:5 |
| | | | | 0.9:1 |

TABLE 10-continued

DISTRIBUTION OF BLOCK TO RANDOM
(mol % ratio) COPOLYMERS

| Test Run | Catalyst Example | mol % PP, total | wt % PP, total | block:random mol % |
|---|---|---|---|---|
| | | | | Comparative |
| a | 56 | 23 | 18 | 19:4 |
| b | 56 | 20 | 16 | 20:0 |
| c | 56 | 18 | 14 | 15:3 |
| d | 56 | 12 | 9 | 9:3 |
| e | 57 | 7 | 5 | 7:0 |
| f | 57 | 24 | 19 | 21:3 |
| g | 57 | 23 | 18 | 19:4 |
| h | 57 | 42 | 35 | 39:3 |
| | | | | 7.5:1 |

What is claimed is:

1. In a process for making a solid non-layer catalyst component for use in catalysts for the polymerization of at least one olefin, which process comprises chlorinating at least one organic magnesium compound of the formula MgR'R" wherein R' and R" are the same or different and each is an alkyl group of 1 to 20 carbon atoms, with at least one chlorinating agent to form a carrier, contacting the carrier thus obtained with liquid titanium tetrachloride in the presence of an electron donor selected from the group consisting of inorganic and organic esters, amines, ethers, alcoholates, silane compounds, ketones, and phosphor amides at $-25°$ to $180°$ C.; and recovering said solid non-layer catalyst component, the improvement which comprises employing as said chlorinating agent chlorine gas or a mixture of chlorine gas and alkyl chloride and contacting said carrier first with titanium tetrachloride, then with said electron donor compound and after that at least once with titanium tetrachloride in the absence of said electron donor compound.

2. A process according to claim 1 in which said carrier is contacted with a silicone oil and an aliphatic or aromatic alcohol before contacting with titanium tetrachloride.

3. A process according to claims 1 or 2 in which said alkyl chloride is butyl chloride.

4. A process according to claims 1 or 2 in which said first contacting with titanium tetrachloride is carried out at a temperature below $0°$ C.

5. A process according to claims 1 or 2 in which said alkyl chloride is butyl chloride and said first contacting with titanium tetrachloride is carried out at a temperature below $0°$ C.

6. A process according to claims 1 or 2 in which the said contacting with titanium tetrachloride in the absence of said electron donor compound is carried out at a temperature above $0°$ C. for at least one hour.

7. A process according to claims 1 or 2 in which said chlorinating agent is chlorine gas and that the contacting with titanium tetrachloride is carried out by contacting said carrier first with titanium tetrachloride at a temperature below $0°$ C., then with said electron donor compound and after that at least once with titanium tetrachloride during a prolonged period of at least one hour at a temperature above $0°$ C. in the absence of said electron donor compound.

8. A solid non-layer catalyst component made by a process according to claims 1 or 2.

9. A solid non-layer catalyst component according to claim 8 which exhibits an X-ray diffraction pattern sustantially the same as FIG. 2.

10. A solid non-layer catalyst component made by a process according to claim 3.

11. A solid non-layer catalyst component made by a process according to claim 4.

12. A solid non-layer catalyst component made by a process according to claim 5.

13. A solid non-layer catalyst component made by a process according to claim 6.

14. A solid non-layer catalyst component made by a process according to claim 7.

15. Catalyst for the polymerization and copolymerization of olefins, comprising
   (a) an organometallic aluminum compound of the formula $AlR_xCl_{3-x}$ wherein R is an alkyl radical and X is between 1 and 3,
   (b) an electron donor compound which is able to form a complex with the organometallic aluminum compound (a),
   (c) a solid non-layer catalyst component according to claim 8.

16. Catalyst for the polymerization and copolymerization of olefins, comprising
   (a) an organometallic aluminum compound of the formula $AlR_xCl_{3-x}$ wherein R is an alkyl radical and X is between 1 and 3,
   (b) an electron donor compound which is able to form a complex with the organometallic aluminum compound (a),
   (c) a solid non-layer catalyst component according to claim 9.

17. Catalyst for the polymerization and copolymerization of olefins, comprising
   (a) an organometallic aluminum compound of the formula $AlR_xCl_{3-x}$ wherein R is an alkyl radical and X is between 1 and 3,
   (b) an electron donor compound which is able to form a complex with the organometallic aluminum compound (a),
   (c) a solid non-layer catalyst component according to claim 10.

18. Catalyst for the polymerization and copolymerization of olefins, comprising
   (a) an organometallic aluminum compound of the formula $AlR_xCl_{3-x}$ wherein R is an alkyl radical and X is between 1 and 3,
   (b) an electron donor compound which is able to form a complex with the organometallic aluminum compound (a),
   (c) a solid non-layer catalyst component according to claim 11.

19. Catalyst for the polymerization and copolymerization of olefins, comprising
   (a) an organometallic aluminum compound of the formula $AlR_xCl_{3-x}$ wherein R is an alkyl radical and X is between 1 and 3,
   (b) an electron donor compound which is able to form a complex with the organometallic aluminum compound (a),
   (c) a solid non-layer catalyst component according to claim 12.

20. Catalyst for the polymerization and copolymerization of olefins, comprising
   (a) an organometallic aluminum compound of the formula $AlR_xCl_{3-x}$ wherein R is an alkyl radical and X is between 1 and 3,
   (b) an electron donor compound which is able to form a complex with the organometallic aluminum compound (a), (c) a solid non-layer catalyst component according to claim 13.

21. Catalyst for the polymerization and copolymerization of olefins, comprising (a) an organometallic aluminum compound of the formula $AlR_xCl_{3-x}$ wherein R is an alkyl radical and X is between 1 and 3, (b) an electron donor compound which is able to form a complex with the organometallic aluminum compound (a), (c) a solid non-layer catalyst component according to claim 14.

22. Catalyst according to claim 15 in which said organometallic aluminum compound is triethylaluminum.

23. Catalyst according to claim 15 in which said organometallic aluminum compound is triisobutylaluminum.

* * * * *

UNITED STATES PATENT AND TRADEMARK OFFICE
CERTIFICATE OF CORRECTION

PATENT NO. : 4,673,661
DATED : June 16, 1987
INVENTOR(S) : Barbro U. Lofgren et al.

It is certified that error appears in the above-identified patent and that said Letters Patent are hereby corrected as shown below:

Column 11, line 3, after "70°-80°C", insert
--so that the partial pressue of
propylene increased to 31.3 bar--;

Column 11, line 21, "determined" is misspelled;

Column 11, line 43, "isotacticity" is misspelled;

Column 13, line 2, "addition" is misspelled;

Column 18, line 32, "polymerization" is misspelled.

Signed and Sealed this

Thirteenth Day of October, 1987

*Attest:*

DONALD J. QUIGG

*Attesting Officer*  *Commissioner of Patents and Trademarks*